US012586489B2

(12) United States Patent
Thompson

(10) Patent No.: US 12,586,489 B2
(45) Date of Patent: Mar. 24, 2026

(54) RAIL MOUNT FLAGPOLE

(71) Applicant: Kenneth LeRoy Thompson, Bay Village, OH (US)

(72) Inventor: Kenneth LeRoy Thompson, Bay Village, OH (US)

( * ) Notice: Subject to any disclaimer, the term of this patent is extended or adjusted under 35 U.S.C. 154(b) by 0 days.

(21) Appl. No.: 17/487,746

(22) Filed: Sep. 28, 2021

(65) Prior Publication Data

US 2022/0101763 A1 Mar. 31, 2022

Related U.S. Application Data

(60) Provisional application No. 63/084,338, filed on Sep. 28, 2020.

(51) Int. Cl.
*G09F 17/00* (2006.01)

(52) U.S. Cl.
CPC ...... *G09F 17/00* (2013.01); *G09F 2017/0058* (2013.01); *G09F 2017/0075* (2013.01)

(58) Field of Classification Search
CPC ............. G09F 17/00; G09F 2017/0058; G09F 2017/0075
See application file for complete search history.

(56) References Cited

U.S. PATENT DOCUMENTS

| | | | | | |
|---|---|---|---|---|---|
| 430,272 | A * | 6/1890 | Darnell | E05D 5/02 | 16/253 |
| 868,942 | A * | 10/1907 | Reid | E04B 1/18 | 403/336 |
| 1,015,717 | A * | 1/1912 | Shimer | A01K 97/10 | 248/514 |
| 1,279,669 | A * | 9/1918 | Deming | B60R 13/00 | 248/541 |
| 1,535,396 | A * | 4/1925 | Buehler | B60R 13/00 | 248/541 |
| 1,554,758 | A * | 9/1925 | Post | | |
| 1,737,151 | A * | 11/1929 | Derbyshire | E04H 12/32 | 248/223.41 |
| 1,787,150 | A * | 12/1930 | Gerow | E04H 12/32 | 248/230.8 |
| 2,726,058 | A * | 12/1955 | Foltz | G01B 5/25 | 248/230.9 |
| 3,083,431 | A * | 4/1963 | Lewis | F16B 45/02 | 24/599.7 |

(Continued)

FOREIGN PATENT DOCUMENTS

| | | | | |
|---|---|---|---|---|
| KR | 200437791 Y1 * | 1/2008 | | G09F 17/0091 |

OTHER PUBLICATIONS

KR-200240957-Y1; “Flag Rotatable”, 2001. (Year: 2001).*
KR-880003203-Y1; Lee et al., “A Flag”, 1988. (Year: 1988).*

*Primary Examiner* — Kristina M Deherrera
*Assistant Examiner* — Tania Courson
(74) *Attorney, Agent, or Firm* — Weisun Rao; Jun Chen; Venture Partner, LLC

(57) ABSTRACT

The present invention provides a flag-mounting device to be fastened onto a rail for securely mounting and holding a flag. The device includes a flagpole and a mounting apparatus that are made of strong material. The device is durable and easy to be installed onto a rail. The device can also be used on a pipe, a tube, or any objects with straight parallel sides and a circular or oval cross section. The present invention also provides a method for mounting a flag onto a rail.

15 Claims, 18 Drawing Sheets

(56) References Cited

U.S. PATENT DOCUMENTS

| | | | | | |
|---|---|---|---|---|---|
| 3,162,409 | A * | 12/1964 | Straayer | E04H 12/32 248/514 |
| 3,183,886 | A * | 5/1965 | Moffitt, Jr. | G09F 17/0091 116/173 |
| 3,268,946 | A * | 8/1966 | Case | F16B 7/0433 16/253 |
| 3,438,651 | A * | 4/1969 | Hertoghe | B62J 6/20 248/539 |
| 4,474,132 | A * | 10/1984 | Fritsch | G09F 17/00 116/173 |
| 5,305,978 | A * | 4/1994 | Current | F16L 3/1075 248/230.4 |
| 5,522,342 | A * | 6/1996 | Chen-Chao | G09F 17/00 116/174 |
| 5,603,389 | A * | 2/1997 | Zemon | A62B 35/0068 248/219.2 |
| 5,809,930 | A * | 9/1998 | Brooks | G09F 17/00 40/601 |
| 6,257,537 | B1 * | 7/2001 | Williams | A01M 29/32 248/213.1 |
| 6,276,651 | B1 * | 8/2001 | Dolan | B25B 5/10 411/408 |
| D499,666 | S * | 12/2004 | Ciaccia | D11/181 |
| 6,845,730 | B2 * | 1/2005 | Cardarelli | G09F 17/00 116/173 |
| 6,857,386 | B2 * | 2/2005 | Brewer | G09F 17/00 116/173 |
| 6,935,268 | B1 * | 8/2005 | Hawkins | H01Q 1/1228 116/28 R |
| 7,387,282 | B2 * | 6/2008 | Kovac | F16L 3/237 248/65 |
| 8,069,811 | B2 * | 12/2011 | Ciaccia | G09F 17/00 116/173 |
| 8,141,839 | B2 * | 3/2012 | Buchner | E04H 12/2269 248/533 |
| 8,172,277 | B2 * | 5/2012 | Sarkisyan | F16L 21/005 285/373 |
| 8,500,073 | B2 * | 8/2013 | Quesnel | H02G 7/053 24/514 |
| 8,727,298 | B2 * | 5/2014 | Shaffstall | F16M 13/02 248/68.1 |
| 8,967,072 | B2 * | 3/2015 | Chen | E04H 12/32 116/173 |
| 9,159,254 | B2 * | 10/2015 | Oyoung | G09F 17/00 |
| 9,181,738 | B2 * | 11/2015 | Lindstrom | E05D 1/04 |
| 9,638,402 | B2 * | 5/2017 | Paradiso | F16B 35/005 |
| 10,685,590 | B2 * | 6/2020 | Muir | G09F 17/0091 |
| 11,488,502 | B2 * | 11/2022 | Klevana | G09F 17/00 |
| 11,587,476 | B1 * | 2/2023 | Millar | G09F 17/0091 |
| D985,422 | S * | 5/2023 | Liao | D8/349 |
| 2004/0200402 | A1 * | 10/2004 | Brewer | G09F 17/00 116/174 |
| 2005/0193940 | A1 * | 9/2005 | Swenson | G09F 17/00 116/174 |
| 2005/0263667 | A1 * | 12/2005 | Fisher | B62J 11/00 248/534 |
| 2006/0021562 | A1 * | 2/2006 | Laird | G09F 17/00 116/174 |
| 2006/0118693 | A1 * | 6/2006 | Fisher | B62J 11/00 248/534 |
| 2007/0252071 | A1 * | 11/2007 | Huang | B62J 11/00 248/539 |
| 2011/0162575 | A1 * | 7/2011 | Jahnz | G09F 17/00 248/219.4 |
| 2011/0272552 | A1 * | 11/2011 | Jeffries | G09F 17/00 248/535 |
| 2015/0144760 | A1 * | 5/2015 | Paradiso | F16M 13/022 248/534 |
| 2023/0005397 | A1 * | 1/2023 | Zhang | G09F 17/00 |

* cited by examiner

RAIL MOUNT FLAGPOLE

CROSS-REFERENCE TO RELATED APPLICATION

This application claims priority to U.S. Application No. 63/084,338, filed on Sep. 28, 2020, the contents of which are incorporated herein by reference in their entirety.

BACKGROUND OF THE INVENTION

Field of the Invention

The present invention generally relates to the field of flag mounting devices and methods and more specifically relates to a flag mounting device for use on a rail or tube.

Description of the Related Art

A flag mounting device can be used to mount a flag that represents a country, a group, or a club. In particular, people often wish to use a flat-mounting device to mount a flag on a rail, tube or pipe structure, e.g., on yachts, boats, watercrafts, other vehicles, and building. For instance, it is popular to display a burgee flag that represents a club logo/banner on the railing at the bow of a boat. In some cases, flag displaying is even mandatory while aboard a sea vessel such as a boat or yacht.

Conventional rail mount flag mounting systems are complicated and unstable. For instance, commercial burgee flagpoles in the market typically include separate tube and clamp parts, with unstable structures and fragile materials. In practice, it has been noticed that those commercial flagpoles are easily bent and broke out of the clamp due to wind resistance exerted on the burgee flag, which also results in easy loss of the flags. Additionally, conventional mounts to hold the flags tend to allow the flag to wrap around pole from changing wind directions, and thus would disturb the flag displaying.

To overcome these drawbacks, it is therefore desirable to have a flag mounting device that is sufficiently sturdy such that it will not get damaged easily and can last for a long time. It is also desirable to have a flag mounting device that is easily installed in order to minimize installation time and cost. Further, it is desirable to have a flag mounting device that prevents undesired wrapping and tangling of the flag in order to provide improved flag displaying.

SUMMARY OF THE INVENTION

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

The present invention generally relates to a novel type of flag-mounting devices for use on a rail, with an integral assembly of flagpole (e.g., a solid steel flagpole) and clamp (e.g., clamshell type of clamp) structures for securely mounting and holding a flag. For instance, the flagpole may be welded to the clamp as a single-piece being sufficiently stable and strong for use on a rail of vehicles. The clamp may include two clamp bodies (e.g., jaws) pivotally connected with one another at one end, and fastenable together by a fastener at the opposite end. The fastener (e.g., mounting screw) can also be held in with a retaining component (e.g., O-ring 12*a*) to prevent falling or loss of the fastener. Moreover, since the conventional standard mount to hold the flags tends to cause the flag to wrap around the pole from changing wind direction, the present improved invention may further include a swivel bearing to fit over the flagpole staff, thereby allowing the flag to rotate 360 degrees as the watercraft changes directions. The swivel bearing is optionally movable along the flagpole to accommodate different sizes of flag. Further, the flagpole according to the invention can include a thread at its top to allow additional devices to be attached, such as a camera or decorative ornament. As such, the flag-mounting devices according to the present invention not only is able to securely mount and hold a flag for use on a rail, but also provides easy and convenient installation, as well as adjustable and improved flag displaying.

In one aspect, the present invention provides a flag-mounting device for use on a rail. The device includes a flagpole and a mounting apparatus. In some embodiments, the mounting apparatus is a clamp.

In some embodiments, the flag-mounting device includes a clamp for mounting onto the rail and a flagpole configured for hanging and holding the flag. The clamp includes an upper clamp body; a lower clamp body pivotally connected to the upper clamp body at a pivoting point, wherein the upper and lower clamp bodies are movable between an open position and a closed position, and when in the closed position, the upper and lower clamp bodies form a loop for the clamp tightly grasping and mounting to the rail; and a fastener configured to fasten and lock the upper and lower clamp bodies at the closed position. The flagpole includes a shaft, a top end and a bottom end, wherein the bottom end of the flagpole is welded or connected onto the upper clamp body of the clamp. In some embodiments, the flagpole and clamp forming a unitary, integral, and single-piece assembly.

In some embodiments, the flag-mounting device further includes two swivel coupler assemblies attachable to shaft of the flagpole, each comprising means for swivelly mounting and holding the flag, thereby enabling the flag to rotate about the flagpole, in order to prevent wrapping or tangling of the flag due to change of wind directions.

In some embodiments, at least one of the swivel coupler assemblies is movable along the shaft of the flagpole, thereby allowing adjustment of the length between the swivel coupler assemblies for different flag sizes.

In some embodiments, the flag-mounting device further includes upper and lower clamp inserts positioned within the upper and lower clamp bodies respectively, wherein when the upper and lower clamp bodies are in the closed position, the upper and lower clamp inserts form an inner surface within the loop for tightly and securely mounting to the rail.

In some embodiments, the clamp inserts are removable from the upper and low clamp bodies.

In some embodiments, the clamp inserts are made of a thermoplastic material.

In some embodiments, the upper and lower clamp bodies are pivotally connected by a hinge.

In some embodiments, the fastener comprises a screw, bolt or pin.

In some embodiments, the fastener further comprising a retaining component for securely retaining the fastener to the upper clamp body or the lower clamp body, thereby preventing falling or loss of the fastener even when the clamp bodies are in the open position.

In some embodiments, the retaining component comprises an O-ring.

In some embodiments, the flagpole is solid.

In some embodiments, the flagpole is made of a material selected from the group consisting of steel, metal, and plastic.

In some embodiments, the top end of the flagpole includes a thread, thereby allowing an additional device to be attached to the flagpole. In some embodiments, the additional device is a functional device or a decorative ornament.

In some embodiments, the rail is on a vehicle. In some embodiments, the vehicle is a boat, a ship, or a motorcycle.

In some embodiments, the flag is a burgee flag to be mounted to a boat.

In another aspect, the present invention provides a method for mounting a flag onto a rail. The method includes:

1) providing a flag-mounting device comprising: (i) a clamp for mounting onto the rail, the clamp comprising upper and lower clamp bodies pivotally connected with one another at one end, and fastenable together by a fastener at the opposite end, wherein the upper and lower clamp bodies are movable between an open position and a closed position, and when in the closed position, the clamp bodies form a loop for tightly grasping the rail; and (ii) a flagpole connected or welded onto the upper clamp body of the clamp as a unitary, integral and single-piece assembly,
2) optionally snapping clamp inserts into interior surfaces of the upper and lower clamp bodies,
3) positioning the upper and lower clamp bodies around the rail, moving the clamp bodies into the closed position, and fastening the clamp bodies by the fastener, in order to securely mount the device onto the rail.

In some embodiments, the method further includes adjusting two swivel coupler assemblies attached to the flagpole and mounting a flag to the swivel coupler assemblies.

BRIEF DESCRIPTION OF DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

FIGS. 16A-I show various views of a clamshell clamp part without inserts: FIG. 16A, right angle perspective view; FIG. 16B, front view; FIG. 16C, left angle perspective view; FIG. 16D, top view; FIG. 16E, side view; FIG. 16F, bottom view; FIG. 16G, left angle perspective view; FIG. 16H, rear view; FIG. 16I, right angle perspective view.

DETAILED DESCRIPTION OF THE INVENTION

Figure 1:
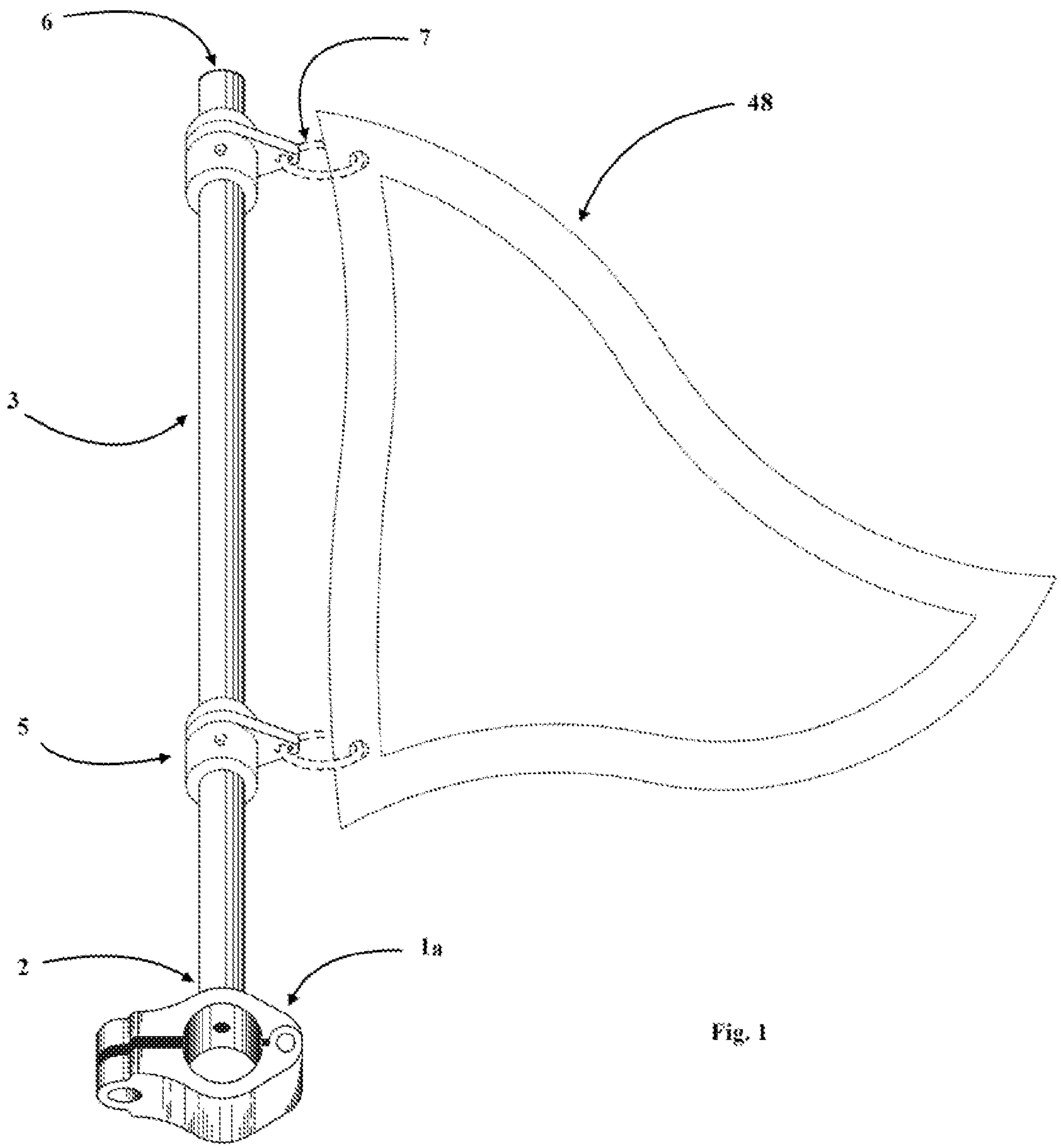
FIG. 1 shows a flagpole assembly according to one embodiment of the present invention with a flag attached.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

Definition

Terms and phrases used in this application, and variations thereof, especially in the appended claims, unless otherwise expressly stated, should be construed as open ended as opposed to limiting. As examples of the foregoing, the term 'including' should be read to mean 'including, without limitation,' 'including but not limited to,' or the like; the term 'comprising' as used herein is synonymous with 'including,' 'containing,' or 'characterized by,' and is inclusive or open-ended and does not exclude additional, unrecited elements or method steps; the term 'having' should be interpreted as 'having at least;' the term 'includes' should be interpreted as 'includes but is not limited to;' the term 'example' is used to provide exemplary instances of the item in discussion, not an exhaustive or limiting list thereof; and use of terms like 'preferably,' 'preferred,' 'desired,' or 'desirable,' and words of similar meaning should not be understood as implying that certain features are critical, essential, or even important to the structure or function, but instead as merely intended to highlight alternative or additional features that may or may not be utilized in a particular embodiment. In addition, the term "comprising" is to be interpreted synonymously with the phrases "having at least" or "including at least". When used in the context of a process, the term "comprising" means that the process includes at least the recited steps, but may include additional steps. When used in the context of a compound, composition or device, the term "comprising" means that the compound, composition or device includes at least the recited features or components, but may also include additional features or components. Likewise, a group of items linked with the conjunction 'and' should not be read as requiring that each and every one of those items be present in the grouping, but rather should be read as 'and/or' unless expressly stated otherwise. Similarly, a group of items linked with the conjunction 'or' should not be read as requiring mutual exclusivity among that group, but rather should be read as 'and/or' unless expressly stated otherwise.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

As used herein, the term "about" or "approximately" means within an acceptable error range for the particular value as determined by one of ordinary skill in the art, which will depend in part on how the value is measured or determined, e.g., the limitations of the measurement system. For example, "about" can mean within 1 or more than 1 standard deviation, per the practice in the given value. Where particular values are described in the application and claims, unless otherwise stated the term "about" should be assumed to mean an acceptable error range for the particular value.

As used herein, the term "or" is meant to include both "and" and "or." In other words, the term "or" may also be replaced with "and/or."

As used herein, the spatially relative terms, such as "upper", "lower", "top", "bottom", "inside", "outside", "above", and "under" may be used herein for ease of description to describe one element or feature's relationship to another element(s) or feature(s) as illustrated in the figures. Similarly, the terms "vertical" and "horizontal" and the like are used for the purpose of explanation only unless specifically indicated. The terms are not intended to require the described elements or structures in a specific direction, and are not intended to limit the scope of this invention as such.

Any titles or subheadings used herein are for organization purposes and should not be used to limit the scope of embodiments disclosed herein.

Embodiments

In one aspect, the present invention provides a flag-mounting device to be fastened onto a rail for securely mounting and holding a flag. The flag-mounting device can also be used on a pipe, a tube, or any objects with straight parallel sides and a circular or oval cross section, on yachts, boats, watercrafts, or buildings.

The flag-mounting device includes a mounting apparatus and a flagpole. In some embodiments, the mounting apparatus is a clamp.

In some embodiments, the flag-mounting device includes a clamp for mounting onto the rail and a flagpole configured for hanging and holding the flag. The clamp includes an upper clamp body; a lower clamp body pivotally connected to the upper clamp body at a pivoting point, wherein the upper and lower clamp bodies are movable between an open position and a closed position, and when in the closed position, the upper and lower clamp bodies form a loop for the clamp tightly grasping and mounting to the rail; and a fastener configured to fasten and lock the upper and lower clamp bodies at the closed position. The flagpole includes a shaft, a top end and a bottom end, wherein the bottom end of the flagpole is welded or connected onto the upper clamp body of the clamp. In some embodiments, the flagpole and clamp forming a unitary, integral, and single-piece assembly.

The flagpole of the flag-mounting device can be various length and diameter. The flagpole and the clamp may be formed of any suitable material. In some embodiment, the flagpole and the clamp are made of stainless steel or other type of alloys. In other embodiments, the flagpole and clamp may be formed of cast aluminum, magnesium, non-metal materials, or the like. It is immaterial to this invention what material the flagpole and the clamp are made of.

In some embodiments, the flagpole is made of strong materials, such as 316 stainless steel bar or tubing.

In some embodiments, the flagpole is solid. In others, the flagpole is hollow.

In some embodiments, the flagpole has movable mounts attached to it. The movable mounts are for holding a flag. The movable mounts are fixed to the flagpole by a fastener (e.g., a hex socket screw) so that the movable mounts can be locked in the desired places on the flagpole. At least one of the movable mounts can be moved up and down along the shaft of the flagpole so that different sized flags can be attached to the flagpole.

In some embodiments, the movable mount includes means for swivelly mounting and holding the flag, thereby enabling the flag to rotate about the flagpole, in order to prevent wrapping or tangling of the flag due to change of wind directions.

In some embodiments, the movable mounts are swivel coupler assemblies, which allows the flag attached to it to be able to rotate 360 degrees around the flagpole and prevent the flag from wrapping the flagpole when the wind changes directions.

In some embodiment, the flagpole includes a thread at the top end of the flagpole. The thread can be a male or female thread. The thread can be used to attach attachments, such as a decorative ornament (knobs or figurines) or a functional device, such as a camera.

The mounting apparatus of the flag-mounting device includes an upper clamp body, a lower clamp body. The upper clamp body and lower clamp body are hingedly connected. In some embodiments, a pin is used to connect the upper clamp body and lower clamp body.

In some embodiment, the clamp further includes upper and lower clamp inserts positioned within the upper and lower clamp bodies respectively, wherein when the upper and lower clamp bodies are in the closed position, the upper and lower clamp inserts form an inner surface within the loop for tightly and securely mounting the clamp to the rail.

The upper and lower clamp inserts may be integrally formed into the upper and lower clamp bodies or may be a suitable separate detachable element. If such a separable detachable element is employed, it may be fixed by any of the usual methods such as screws, glue, or the like.

In some embodiments, the inner side of the upper clamp body and lower clamp body can be metal, plastic, thermoplastic material, or soft pliable material. In some embodiments, clamp inserts made of hard plastic or softer pliable material can be affixed to the upper and lower clamps bodies. The clamp inserts can prevent the rail from getting scuffed or damaged from tightening against the mounting surface, and they can also help absorb vibration that transfer between the materials.

In some embodiments, the mounting apparatus further includes a fastener. The fastener is used for fastening the upper and lower clamp bodies so that the mounting apparatus can be fixed at a position on the rail to be mounted. The fastener can be attached to the upper clamp body or the lower clamp body.

In some embodiments, the fastener is held in either with the upper clamp body or with the lower clamp body by a retaining device. The retaining device prevents the fastener (eg., a screw) from coming out of the clamp and get lost. In some embodiments, the retaining device is an O-ring.

In some embodiments, the fastener is a screw or a bolt. The screw or bolt mates from the lower or upper clamp body to a threaded area in the upper or lower clamp body, respectively.

In some embodiments, the flagpole and the mounting apparatus are formed as one integral piece. In some embodiments, the flagpole and the mourning apparatus are formed separately and later assembled together.

In some embodiments, the flagpole and the mounting apparatus are formed separately first, then the flagpole and the mounting apparatus are welded together. In some embodiments, the flagpole is welded to the upper clamp body. The location of the flagpole can be at the center top of the upper clamp body directly perpendicular to where the clamp will connect to the rail. The location can be other places on the upper clamp body.

In some embodiments, the rail is on a vehicle. In some embodiments, the vehicle can be a boat, a ship, or a motorcycle. In some embodiments, the flag is a burgee flag.

In another aspect, the present invention provides a method for mounting a flag onto a rail. The method includes:

1) providing a flag-mounting device comprising: (i) a clamp for mounting onto the rail, the clamp comprising upper and lower clamp bodies pivotally connected with one another at one end, and fastenable together by a fastener at the opposite end, wherein the upper and lower clamp bodies are movable between an open position and a closed position, and when in the closed position, the clamp bodies form a loop for tightly grasping the rail; and (ii) a flagpole connected or welded onto the upper clamp body of the clamp as a unitary, integral and single-piece assembly,
2) optionally snapping clamp inserts into interior surfaces of the upper and lower clamp bodies,
3) positioning the upper and lower clamp bodies around the rail, moving the clamp bodies into the closed position, and fastening the clamp bodies by the fastener, in order to securely mount the device onto the rail.

In some embodiments, the method further includes adjusting two swivel coupler assemblies attached to the flagpole, and mounting a flag to the swivel coupler assemblies.

Some embodiments are shown in FIGS. 1-18.

As shown in FIG. 1, a flag-mounting device includes a flagpole 3 and a clamp 1*a*. The flag-mounting device can be a burgee flagpole. Flagpole 3 is preferably a solid structure to provide sufficient strength, and can be welded (or otherwise connected) to the clamp 1*a* at weld 2 located on the upper clamp body (e.g., middle upper surface) of clamp 1*a* to form a single-piece, integral assembly. It is to be understood that flagpole 3 can be made with various lengths and diameters. It is also be understood that flagpole 3 and clamp 1*a* may be formed of any suitable material, such as stainless steel and other alloys—as long as the material provides sufficient strength for the flag-mounting device. In some embodiments, flagpole 3 is made of 316 stainless steel bar or tubing.

The flag-mounting device also includes coupler assemblies 5. A flag 48 is attached to the coupler assemblies 5 through a clip 7. The clip 7 may be a snap, carabiner, or other suitable coupler. The top 6 of the flagpole 3 may include a thread. The thread can be a male or female thread. The thread can be used to attach an additional device, such as a decorative ornament (knobs or figurines) or a functional device, such as a camera.

Figure 2:
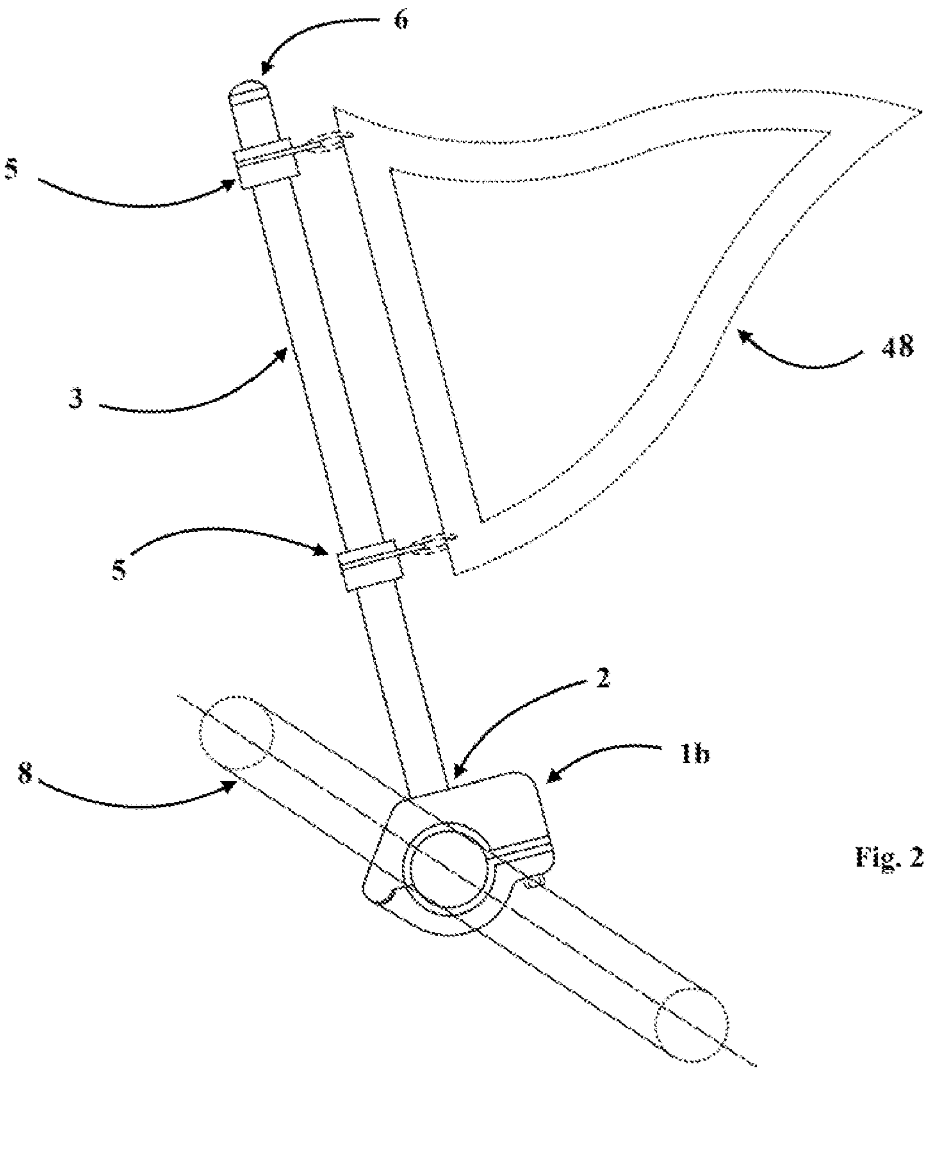
FIG. 2 shows a flagpole assembly with inserts according to another embodiment of the present invention that is installed onto a tube or rail.

FIG. 2 shows that a flag-mounting device is mounted on a rail 8. The top 6 shows a cap installed there, no attachments are attached. 1*b* shows another embodiment of a clamp with inserts installed therein.

Figure 3:
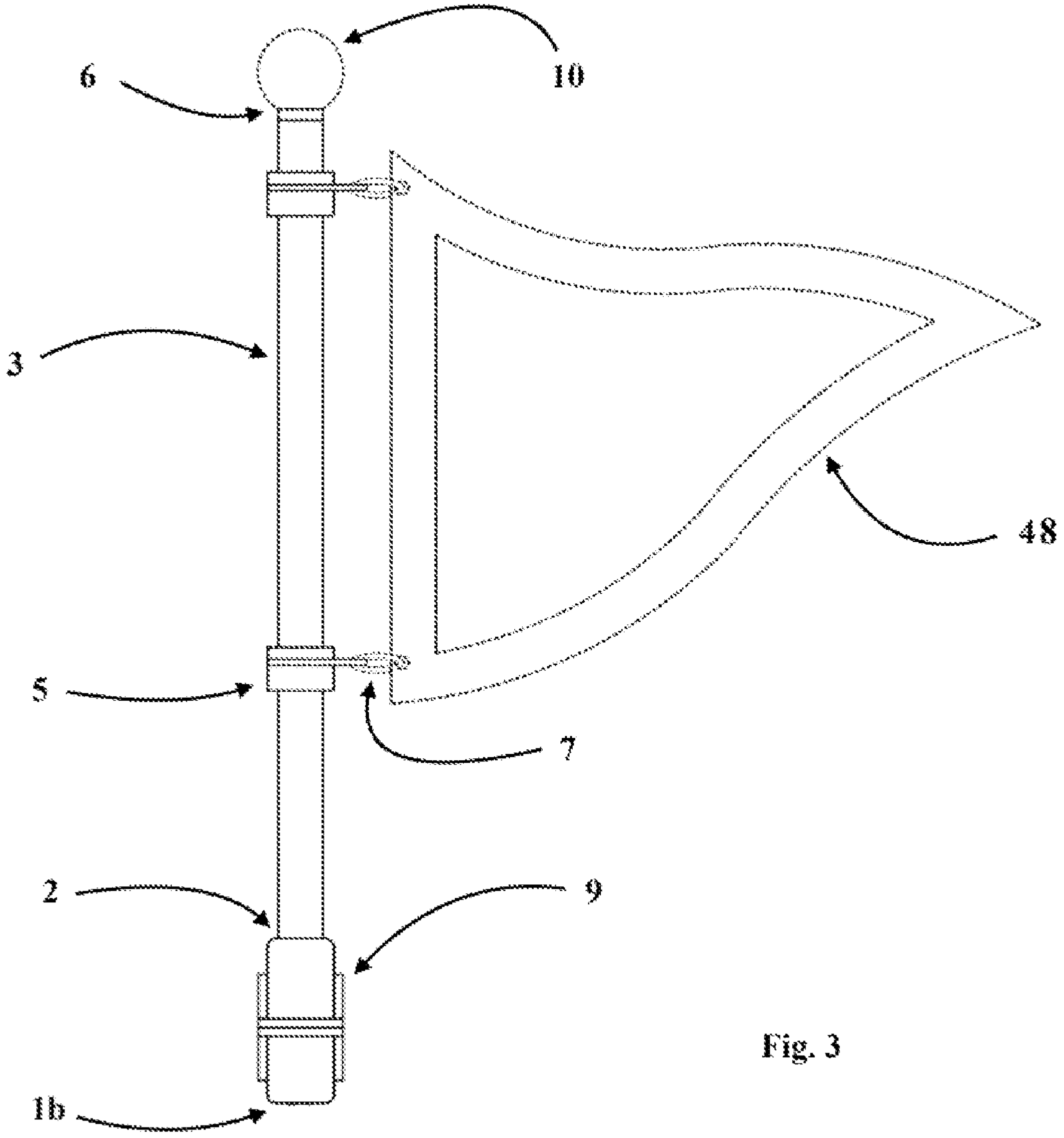
FIG. 3 is a side view of a flagpole assembly according to one embodiment of the present invention with inserts and optionally a ball topper (finial) on the top end of the flagpole.

FIG. 3 shows another embodiment of the flag-mounting device. The flag-mounting device has a ball topper attached to the top 6 of the flagpole 3 (e.g., via thread). Here, the clamp has clamp insert 9 installed. Details about clamp insert 9 can be found in FIG. 5A.

Figure 4:
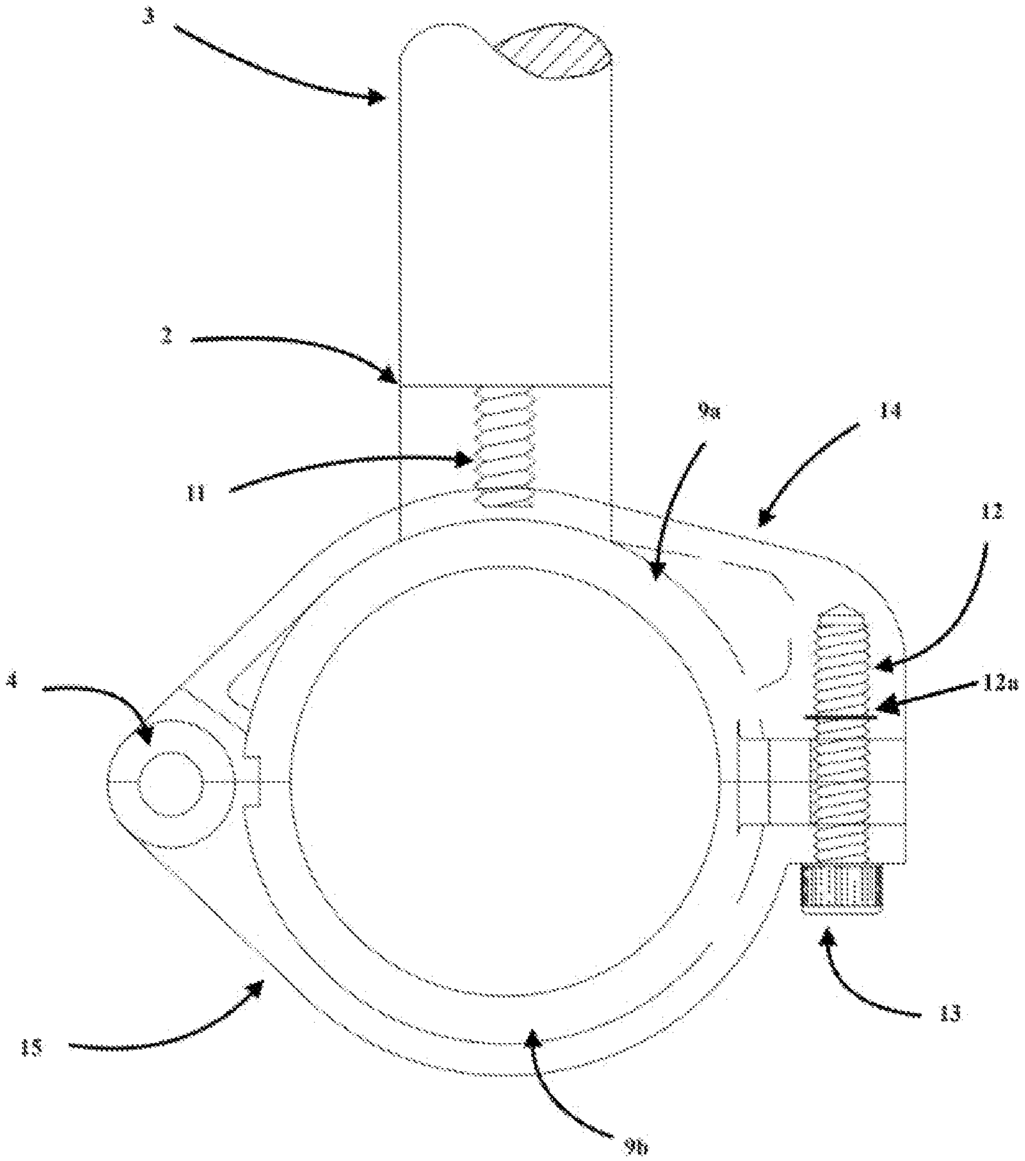
FIG. 4 provides an enlarged view of an exemplary clamp part according to some embodiments of the present invention.

FIG. 4 shows an exemplary clamp part included by some embodiments of this invention. The clamp includes an upper clamp body 14 and a lower clamp body 15, which are joined together by a hinge 4. The hinge 4 may include a pin (see pin 20 in FIG. 8). Upper clamp insert 9*a* and lower clamp insert 9*b* may be installed inside the loop formed by the upper clamp body 14 and the lower clamp body 15. A fastener (e.g., screw 13) is used to fasten the upper clamp body 14 and the lower clamp body 15. It is to be understood that the fastener may include other types or structures, as long as it is able to effectively fasten and lock upper and lower clamp bodies. In the embodiment shown here, the upper clamp body has a threaded fastening aperture 12 to receive the screw 13 from the lower clamp body. In other embodiments, the lower clamp body has a threaded fastening aperture 12 to receive the screw 13 from the upper clamp body.

Figure 5A:
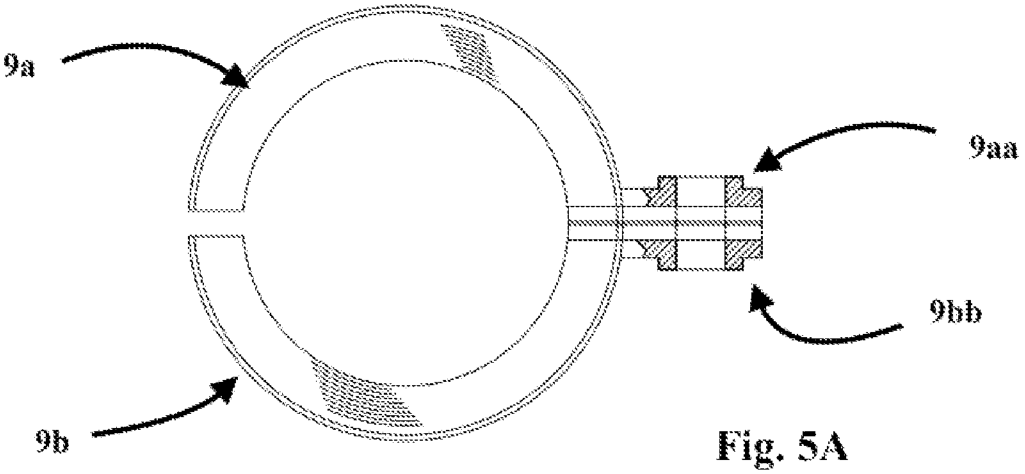
FIG. 5A is a view of upper and lower clamp inserts in some embodiments of the present invention.

FIG. 4 also shows, in some embodiments, there is additional thread 11 at the bottom of the flagpole 3. The thread 11 is used as an additional assistance for securing and welding the flagpole 3 into the upper clamp body of the clamp as a single piece. For instance, the flagpole 3 is welded directly into the upper clamp body after the flagpole 3 is first secured into the upper clamp body through the thread 11. In some embodiments the flagpole 3 can be welded directly to the clamp body without a thread, FIG. 5A shows exemplary clamp inserts according to some embodiments of the present invention. The clamp inserts may include an upper clamp insert 9*a* and a lower clamp insert 9*b*. The upper clamp insert 9*a* may have an end 9*aa* with a protrusion. The lower clamp insert 9*b* may also have an end 9*bb* with a protrusion. The protrusions 9*aa* and 9*bb* can help secure the clamp inserts 9*a* and 9*b* into the clamp. In some embodiments, the clamp insert is made of plastic (e.g., thermoplastic) or softer pliable material. The clamp insert can prevent the rail from getting scuffed or damaged from tightening against the mounting surface, and can also help absorb vibration that transfer between the materials.

Figure 5B:
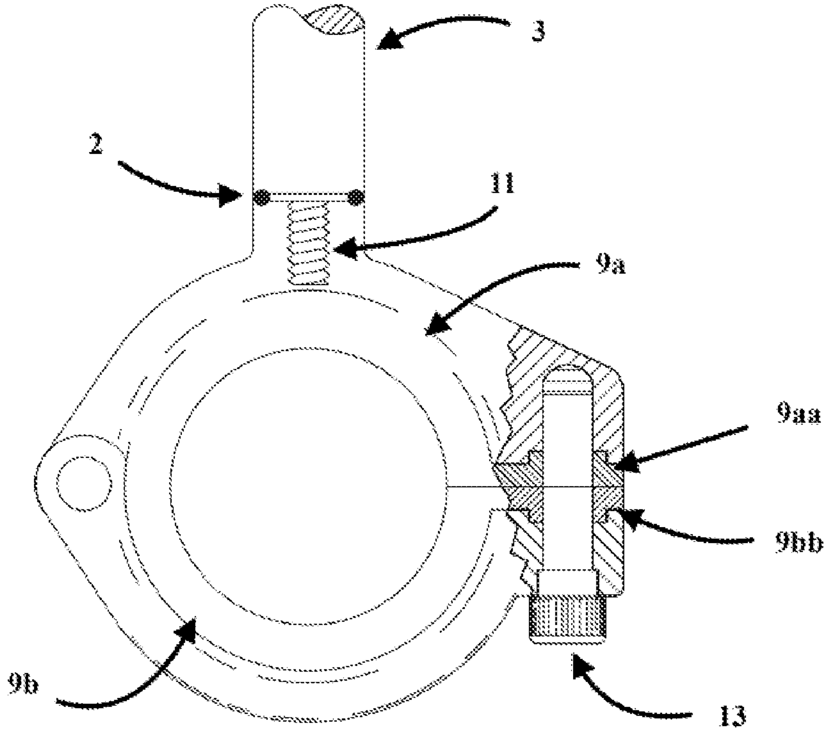
FIG. 5B further illustrates an exemplary clamp part with clamp inserts installed and flagpole welded.

FIG. 5B further illustrates that an upper clamp insert 9*a* and lower clamp insert 9*b* are installed into the clamp.

Figure 6:
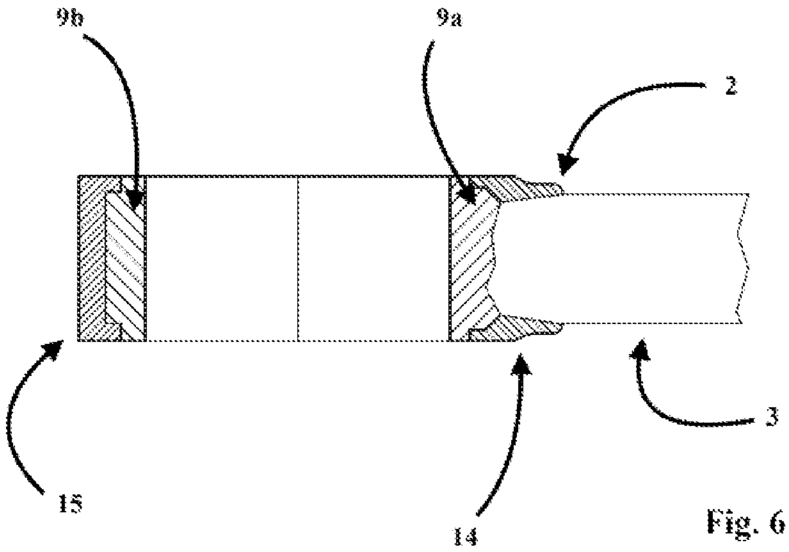
FIG. 6 is a side view of the clamp shown in FIG. 5B.

FIG. 6 is a side view of the clamp shown in FIG. 5B. As shown in FIG. 6, the upper clamp insert 9*a* and lower clamp insert 9*b* are installed into the inside loop formed by upper clamp body 14 and lower clamp body 15. Weld 2 is where flagpole 3 and clamp 14 are joined.

Figure 7A:
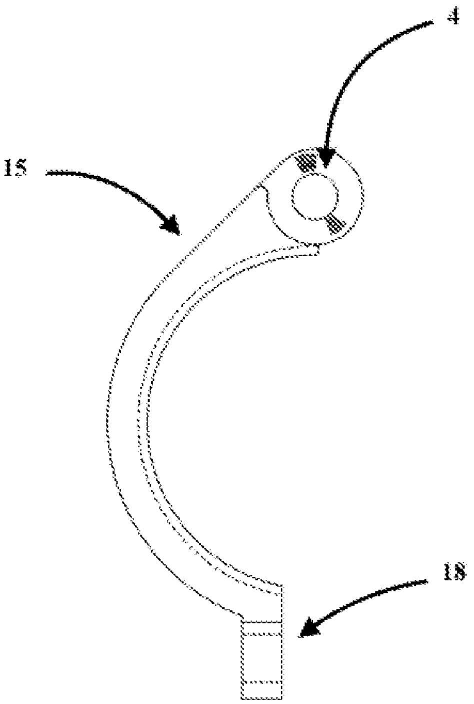
FIG. 7A is a side view of a lower clamp body according to one embodiment of the present application.

FIG. 7A is a side view of a lower clamp body (e.g., lower clamp body 15) with a hinge hole 4 at one end and a through hole 18 at the other end. The hinge hole 4 is where a lower clamp body and an upper clamp body hingedly connected. The through hole 18 is where fastener 13 (shown in FIG. 5B) comes through to fastening the lower clamp body and the upper clamp body.

Figure 7B:
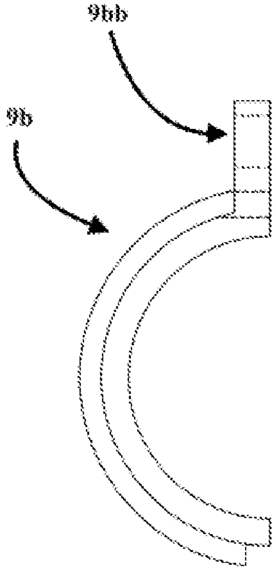
FIG. 7B is a side view of a lower clamp insert according to one embodiment of the present invention.

FIG. 7B provides a side view of lower clamp insert 9*b*, to be coupled with lower clamp body 15.

Figure 7C:
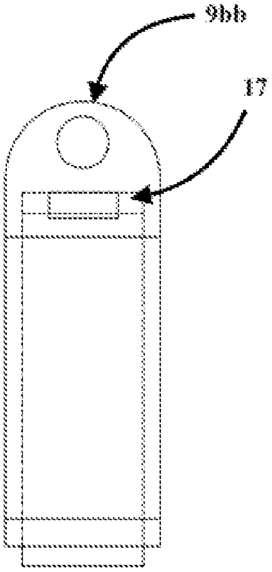
FIG. 7C is a back view of the clamp insert shown in FIG. 7B.

FIG. 7C is a back view of the clamp insert shown in FIG. 7B. In this embodiment, the lower clamp insert has a receiving slot 17 to attach to the lower clamp body engagement tang (not shown). Details on the body engagement tang 15*c* can be found in FIG. 8.

Figure 8:
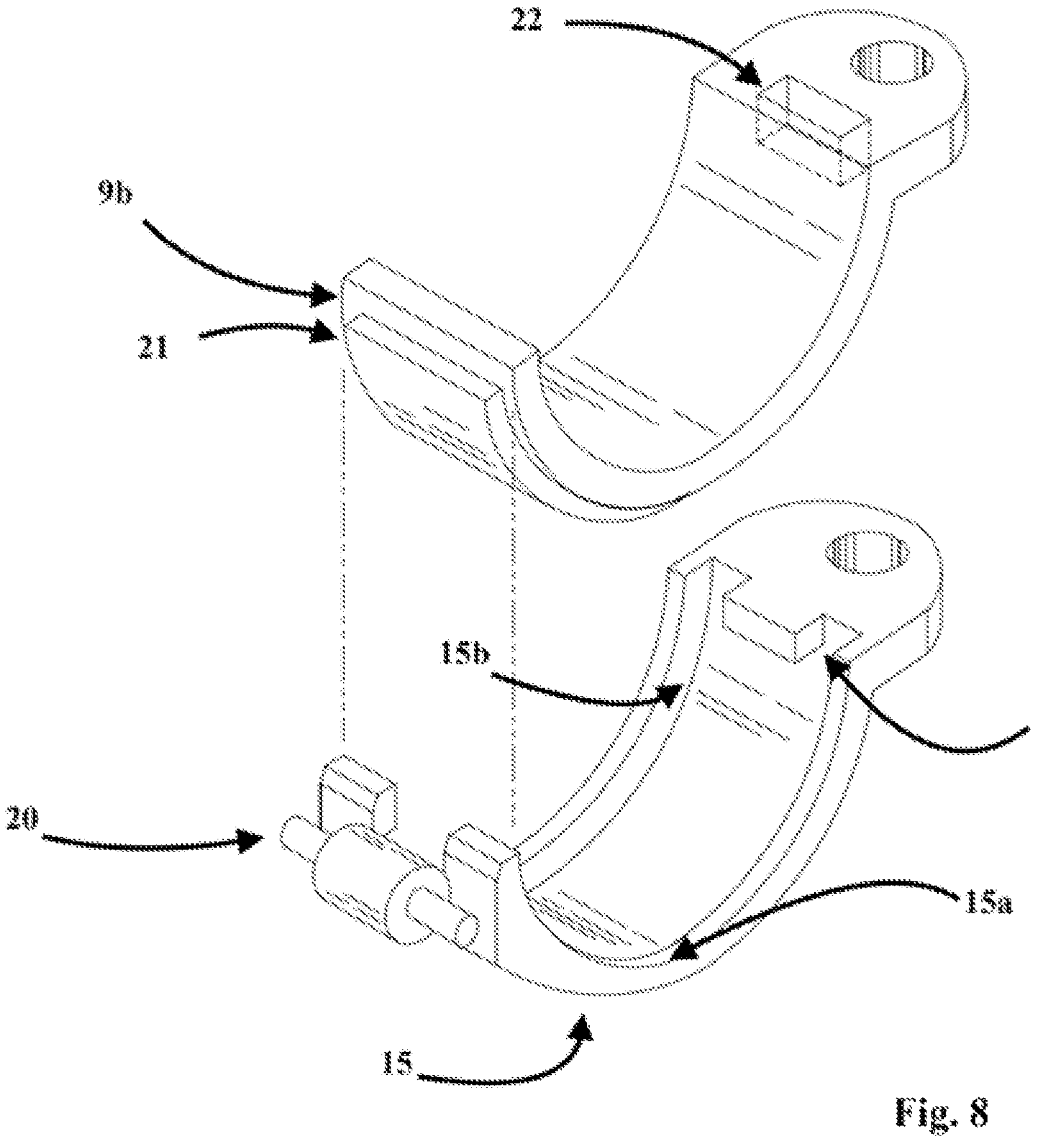
FIG. 8 is a perspective view showing a lower clamp body engaging with a plastic clamp insert.

FIG. 8 further illustrates lower clamp body 15 engaging with clamp insert 9*b*. The lower clamp body 15 has an outer shoulder 15*a*, an inner shoulder 15*b*, and an engagement tang 15*c*. The lower clamp body 15 also has an engagement pin that is used to hingedly connected to the upper clamp body. The clamp insert 9*b* has a raised shoulder, which fits in the space defined by the inner shoulder 15*b* of the lower clamp body. The clamp insert 9*b* also has a receiving slot 22, which attaches to the lower clamp body engagement tang 15*c*.

Figure 9A:
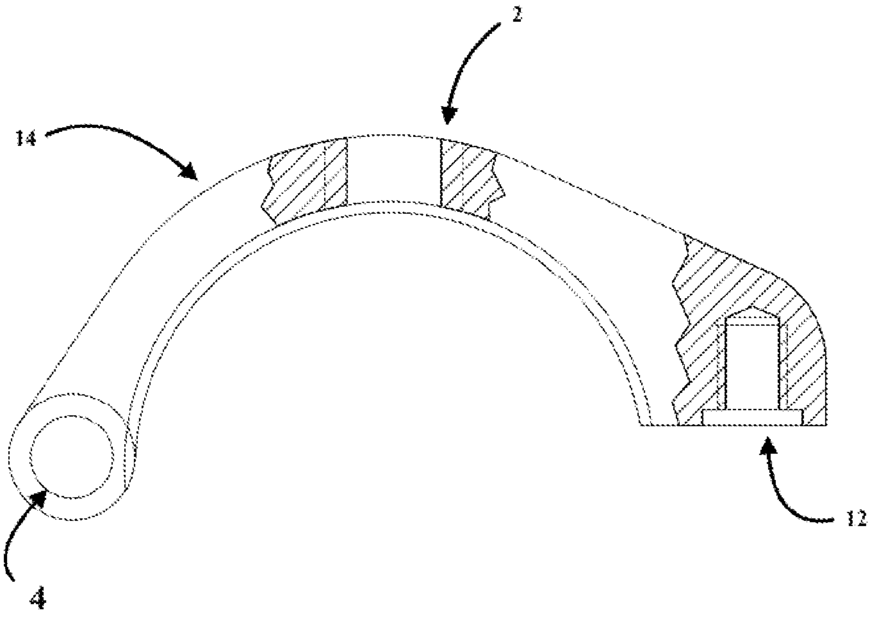
FIG. 9A is a view of an upper clamp body according to one embodiment of the present invention.

FIG. 9A shows an upper clamp body (e.g., upper clamp body 14) with a hinge hole 4 and a fastening aperture 12. The fastening aperture 12 is used to receiving a fastener coming through a lower clamp body. The fastening aperture 12 can be threaded to receive a threaded screw. The upper clamp body 14 also has a weld 2, where a flagpole is secured to a clamp.

Figure 9B:
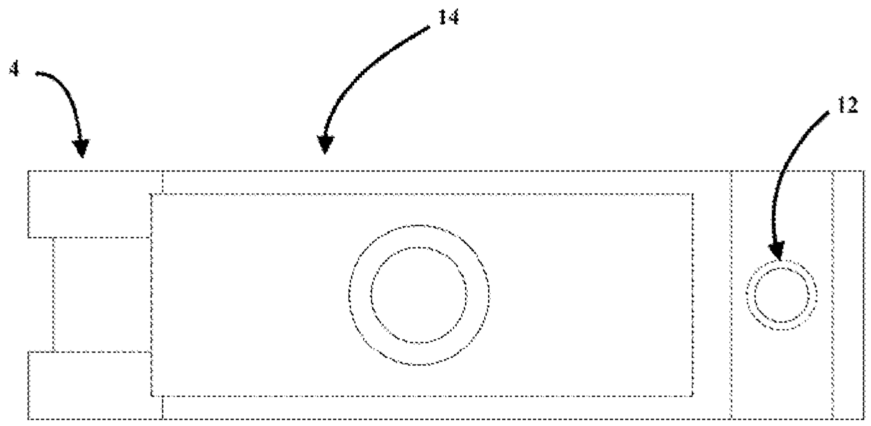
FIG. 9B is a top view of the upper clamp body shown in FIG. 9A.

FIG. 9B is a top view of the upper clamp body shown in FIG. 9A.

Figure 10A:
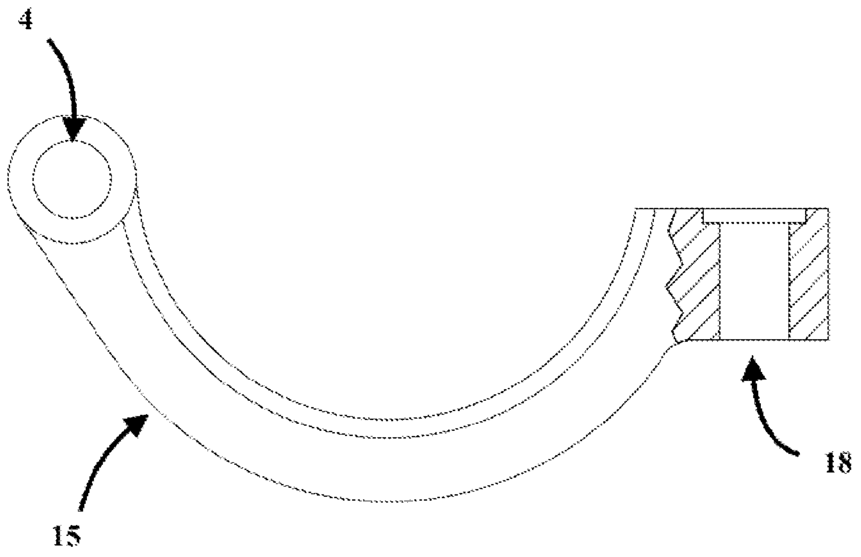
FIG. 10A is a view of a lower clamp body according to one embodiment of the present invention.

FIG. 10A further illustrates lower clamp body 15 with hinge hole 4 and a through hole 18. The through hole 18 allows a fastener coming through the lower clamp body 15 and secure to an upper clamp body.

Figure 10B:
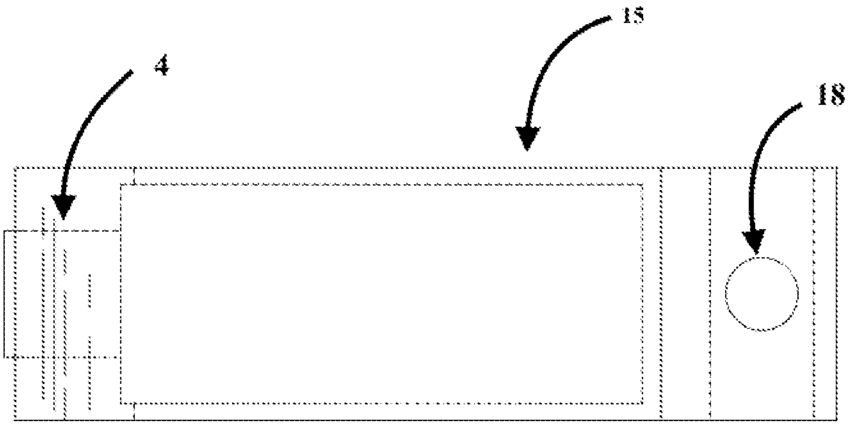
FIG. 10B is a top view of the lower clamp body shown in FIG. 10A.

FIG. 10B is a top view of the lower clamp body shown in FIG. 10A.

Figure 11A:
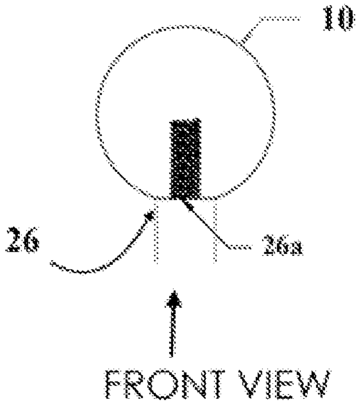
FIG. 11A is a front view of a ball topper or finial topper according to embodiment of the present application.

FIG. 11A is a front view of a ball topper or finial topper 10. The finial topper 10 may have a flat surface 26 to mate up to a flagpole. The finial topper 10 also may have a receive socket 26*a* to receive a screw or pin on top of a flagpole. The receive socket 26*a* may be tapped and threaded.

Figure 11B:
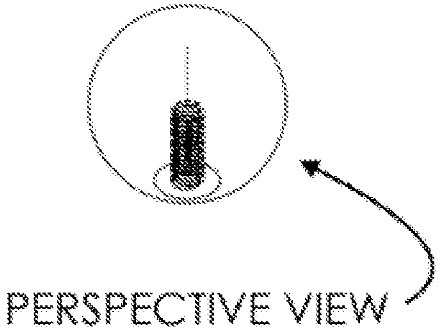
FIG. 11B is a perspective view of the ball topper or finial topper shown in FIG. 11A.

FIG. 11B is a perspective view of the ball topper or finial topper shown in FIG. 11A.

Figure 12:
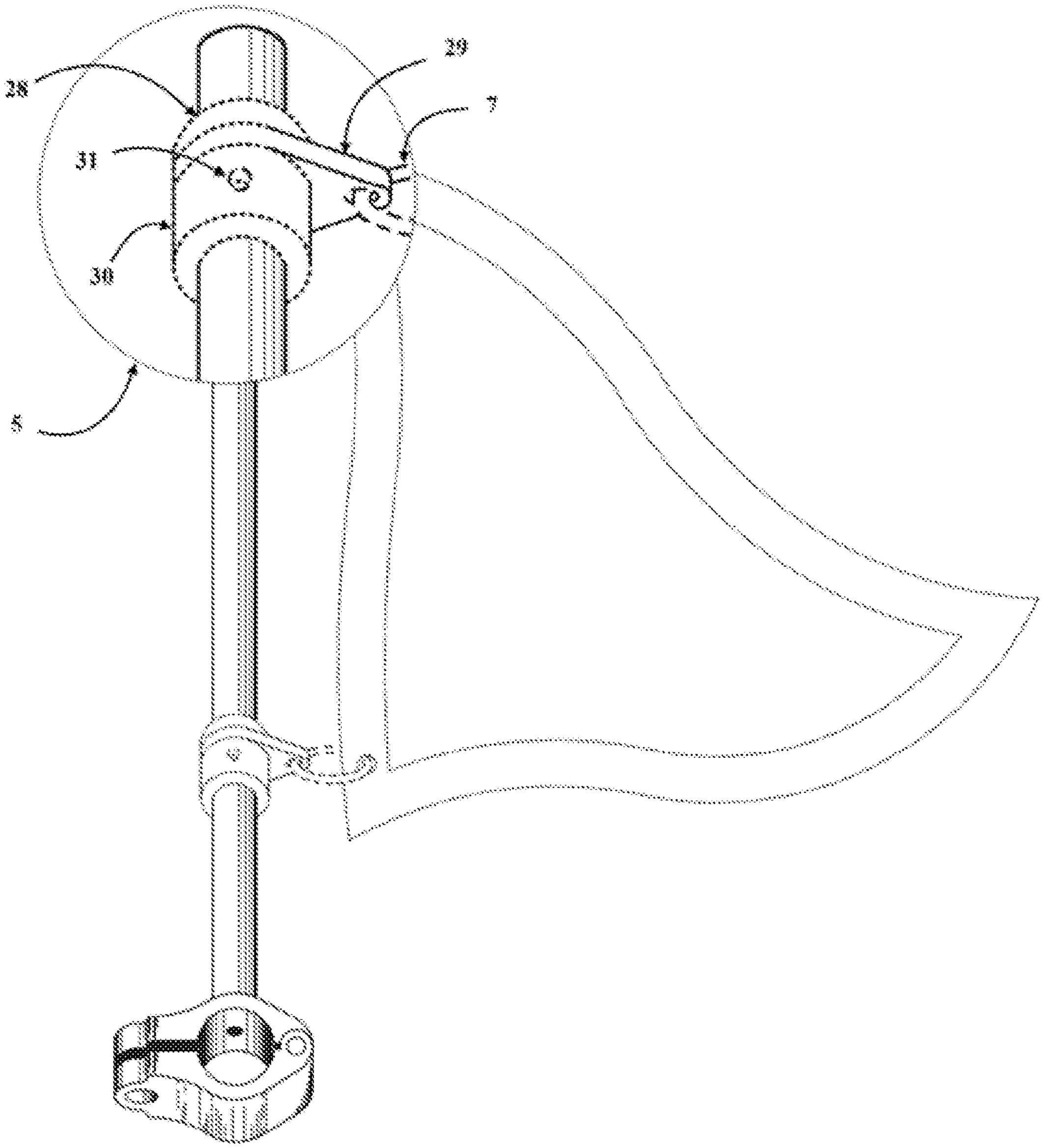
FIG. 12 shows a swivel coupler assembly according to one embodiment of the present invention.

FIG. 12 further shows a flag-mounting device according to one embodiment of the present invention with a swivel coupler assembly 5, which includes a retaining ring 28, a swivel ring 29, a swivel base 30, a set screw 31, and a clip 7. As shown in FIG. 12, a flag is attached to the swivel ring 29 through the clip 7. The position of the swivel ring 29 is based on the position of the swivel base 30. The set screw 31 is used to secure the swivel base 30 to various positions on the flagpole. The swivel base 30 can be moved up and down along the flagpole, thus accommodates flags with various sizes. The swivel ring 29 allows the flag attached to it to be able to rotate 360 degrees around the flagpole and prevent the flag from wrapping the flagpole when the wind changes directions. The retaining ring 28 is designed to thread onto the swivel base 30. Details about retaining ring 28 are shown in FIGS. 13A-C.

Figure 13A:
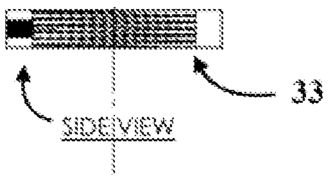
FIG. 13A is a side view of a retaining ring according to one embodiment of the present invention.

FIG. 13A is a side view of retaining ring 28 for a swivel ring. The retaining ring has a through hole tapped thread 33 that can engage with the swivel base threaded top 36 (shown in FIG. 15B) to retain the swivel ring 29 (shown in FIG. 12).

Figure 13B:
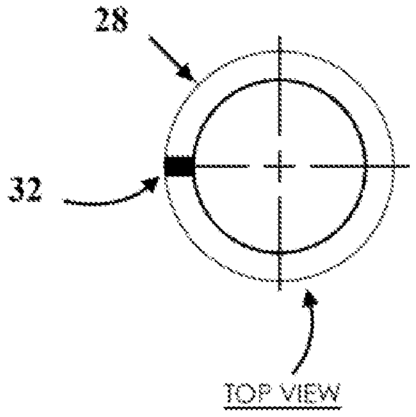
FIG. 13B is a top view of the retaining ring shown in FIG. 13A.

FIG. 13B is a top view of the retaining ring 28 shown in FIG. 13A. The retaining ring 28 has a tapper through hole set screw 32, which can be used to lock the retaining ring 28 onto the threaded swivel base 30 (shown in FIG. 12) to prevent both parts from disengagement due to vibration.

Figure 13C:
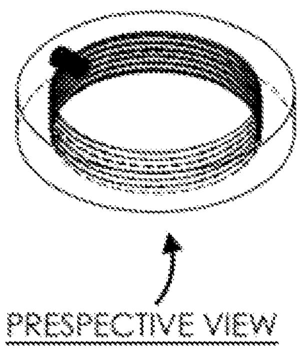
FIG. 13C is a perspective view of the retaining ring shown in FIG. 13A.

FIG. 13C is a perspective view of the retaining ring 28 shown in FIG. 13A.

Figure 14A:
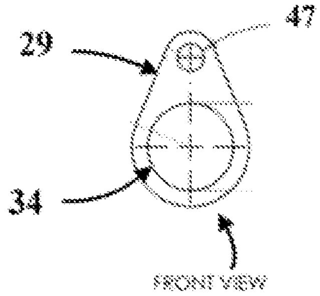
FIG. 14A is a view of a swivel ring according to one embodiment of the present invention.
Figure 14B:
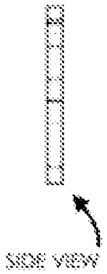
FIG. 14 B is a side view of the swivel ring shown in FIG. 14A.
FIG. 14C is a perspective view of the swivel ring shown in FIG. 14A.
Figure 14C:
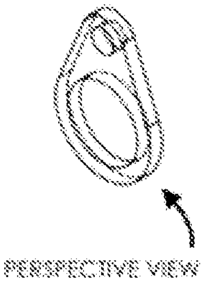

FIGS. 14A-C respectively provide front, side, and perspective views of swivel ring 29. As shown in FIGS. 14A-C, swivel ring 29 has a swivel ring hole 34 and a swivel ring attachment hole 47. The swivel ring attachment hole 47 allows a flag to be secured to the swivel ring 29 easily. The swivel ring hole 34 is sized slightly larger than the swivel base shoulder 37 (shown in FIG. 15B) so that the swivel ring 29 can easily rotate around the swivel base 30 (shown in FIG. 12).

Figure 15A:
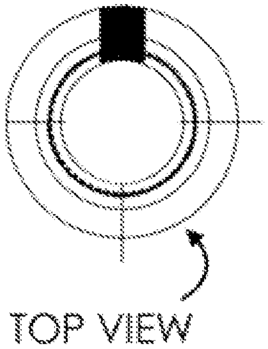
FIG. 15A is a top view of a swivel base.

FIG. 15A is a top view of a swivel base for a swivel ring.

Figure 15B:
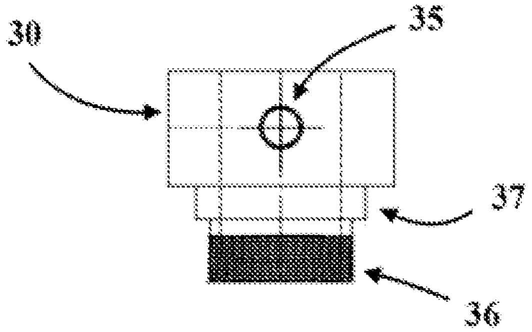
FIG. 15B is a side view of the swivel base shown in FIG. 15A.

FIG. 15B is a side view of the swivel base 30 shown in FIG. 15A. The swivel base has a set screw through hole 35, a swivel base threaded top 36, and a swivel base shoulder 37. The swivel base threaded top 36 is to receive the thread 33 (shown in FIG. 13A) on a retaining ring 28 (shown in FIG. 13B). The swivel base shoulder 37 can be mated with swivel ring hole 34 (shown in FIG. 14A) of the swivel ring 29 (shown in FIG. 14A).

Figure 15C:
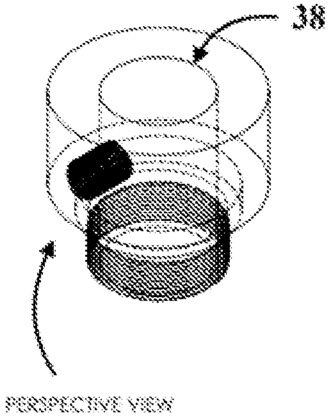
FIG. 15C is a perspective view of the swivel base shown in FIG. 15A.

FIG. 15C is a perspective view of the swivel base shown in FIG. 15A. The swivel base has a through hole 38 that allows the swivel base to slide down a flagpole 3 as shown in FIG. 1.

Figure 16A:
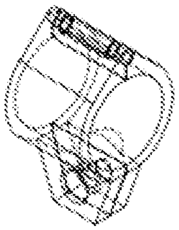
Figure 16B:
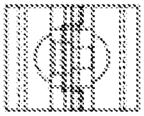
Figure 16C:
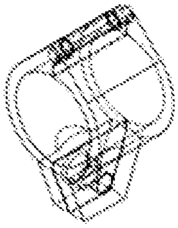
Figure 16D:
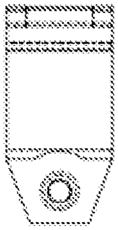
Figure 16E:
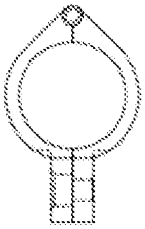
Figure 16F:
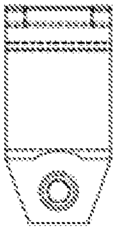
Figure 16G:
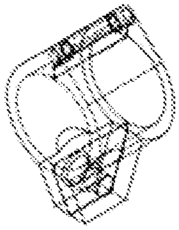
Figure 16F:
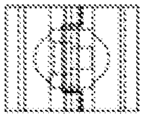
Figure 16I:
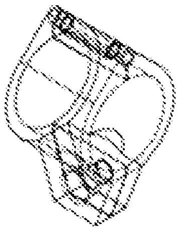

FIGS. 16A-I further show various views of a clamp part without inserts (e.g., la), to be included by the flag-mounting devices according to the present invention: FIG. 16A, right angle perspective view; FIG. 16B, front view; FIG. 16C, left angle perspective view; FIG. 16D, top view; FIG. 16E, side view; FIG. 16F, bottom view; FIG. 16G, left angle perspective view; FIG. 16H, rear view; FIG. 16I, right angle perspective view.

Figure 17:
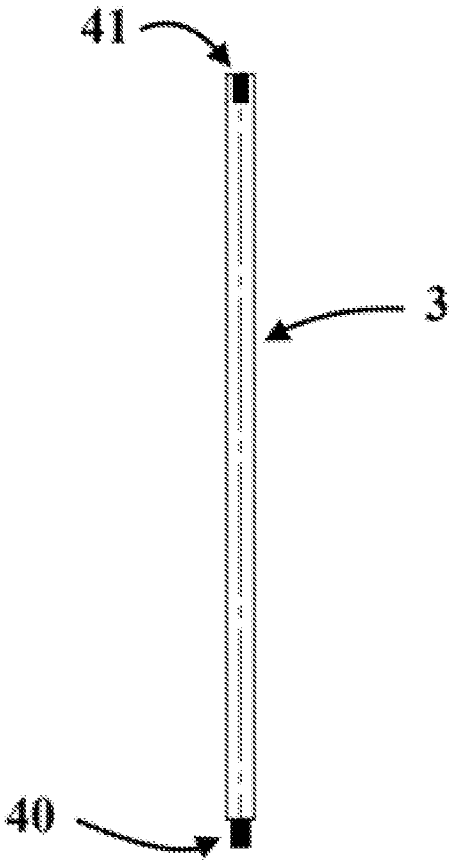
FIG. 17 is a view of a flagpole.

FIG. 17 illustrates a flagpole (e.g., flagpole 3) that has a bottom male thread 40 and a top female thread 41. The bottom male thread 40 assists the flagpole 3 to further secure into a clamp and the top female thread 41 allows an attachment with a male thread to be attached to the flagpole 3.

Figure 18:
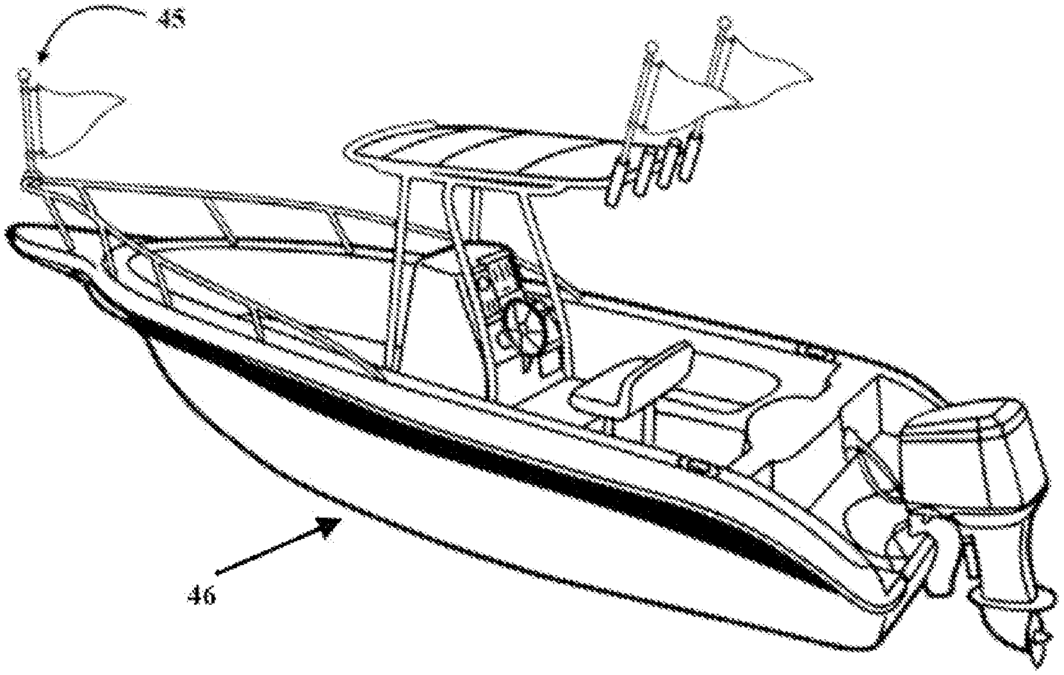
FIG. 18 shows a burgee flagpole that is installed onto a rail of a boat.

FIG. 18 shows an embodiment where a burgee flagpole 45 is installed onto a rail of a boat 46.

Although specific embodiments of this invention have been illustrated herein, it will be appreciated by those skilled in the art that any modifications and variations can be made without departing from the spirit of the invention. The examples and illustrations above are not intended to limit the scope of this invention. Any combination of embodiments of this invention, along with any obvious their extension or analogs, are within the scope of this invention. Further, it is intended that this invention encompass any arrangement, which is calculated to achieve that same purpose, and all such variations and modifications as fall within the scope of the appended claims.

All the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example of a generic series of equivalent or similar features.

OTHER EMBODIMENTS

It is to be understood that while the invention has been described in conjunction with the detailed description thereof and accompanying figures, the foregoing description and accompanying figures are only intended to illustrate, and not limit the scope of the invention, which is defined by the scope of the appended claims. Other aspects, advantages, and modifications are within the scope of the following claims. All publications referenced herein are incorporated by reference in their entireties.

What is claimed is:

1. A flag-mounting device to be fastened onto a rail on a vehicle for securely mounting and holding a flag, comprising:

a clamp for mounting onto the rail, said clamp comprising:

an upper clamp body;

a lower clamp body pivotally connected to the upper clamp body at a pivoting point, wherein the upper and lower clamp bodies are movable between an open position and a closed position, and when in the closed position, the upper and lower clamp bodies form a loop for the clamp tightly grasping and mounting to the rail; and a fastener configured to fasten and lock the upper and lower clamp bodies at the closed position;

a flagpole configured for hanging and holding the flag, having a shaft, a top end and a bottom end, wherein the bottom end of the flagpole is welded onto the upper clamp body of the clamp, said flagpole and clamp forming a unitary, integral, and single-piece assembly; and two swivel coupler assemblies attachable to shaft of the flagpole, each comprising means for swivelly mounting and holding the flag, thereby enabling the flag to rotate about the flagpole, in order to prevent wrapping or tangling of the flag due to change of wind directions, wherein the two swivel coupler assemblies are movable along the shaft of the flagpole, thereby allowing adjustment of the length between the swivel coupler assemblies for different flag sizes, wherein each swivel coupler comprises a retaining ring, a swivel ring, and a swivel base, wherein (i) the swivel ring includes a single swivel ring attachment hole for securing the flag, (ii) the retaining ring has a through hole tapped thread for being engaged with the swivel base, and (iii) the swivel base is an integral piece including a threaded top, a swivel shoulder in middle, and a bottom part sized larger than the swivel shoulder, said threaded top being adapted to receive the thread on the retaining ring, said swivel shoulder being adapted to directly engage with the swivel ring and allow the swivel ring to rotate around the swivel shoulder, wherein the flag-mounting device is configured to be fastened onto the rail on the vehicle and to securely mount and hold the flag, and the vehicle is a boat, a ship, or a motorcycle.

2. The flag-mounting device of claim 1, wherein the upper and lower clamp bodies are pivotally connected by a hinge.

3. The flag-mounting device of claim 1, wherein the fastener comprises a screw, bolt or pin.

4. The flag-mounting device of claim 1, wherein the flagpole is solid.

5. The flag-mounting device of claim 1, wherein the flagpole is made of a material selected from the group consisting of steel, metal, and plastic.

6. The flag-mounting device of claim 1, wherein the flag is a burgee flag to be mounted to the vehicle, wherein the vehicle is a boat.

7. The flag-mounting device of claim 1, further comprising upper and lower clamp inserts positioned within the upper and lower clamp bodies respectively, wherein when the upper and lower clamp bodies are in the closed position, the upper and lower clamp inserts form an inner surface within the loop for tightly and securely mounting to the rail.

8. The flag-mounting device of claim 7, wherein the clamp inserts are removable from the upper and low clamp bodies.

9. The flag-mounting device of claim 7, wherein the clamp inserts are made of a thermoplastic material.

10. The flag-mounting device of claim 1, wherein the fastener further comprising a retaining component for securely retaining the fastener to the upper clamp body or the lower clamp body, thereby preventing falling or loss of the fastener even when the clamp bodies are in the open position.

11. The flag-mounting device of claim 10, wherein the retaining component comprises an O-ring.

12. The flag-mounting device of claim 1, wherein the top end of the flagpole comprises a thread, thereby allowing an additional device to be attached to the flagpole.

13. The flag-mounting device of claim 12, wherein the additional device is a functional device or a decorative ornament.

14. A method for mounting a flag onto a rail on a vehicle, comprising:

providing a flag-mounting device, comprising: (i) a clamp for mounting onto the rail, said clamp comprising upper and lower clamp bodies pivotally connected with one another at one end, and fastenable together by a fastener at the opposite end, wherein the upper and lower clamp bodies are movable between an open position and a closed position, and when in the closed position, the clamp bodies form a loop for tightly grasping the rail; (ii) a flagpole welded onto the upper clamp body of the clamp, said flagpole and clamp forming a unitary, integral, and single-piece assembly; and (iii) two swivel coupler assemblies movable along the shaft of the flagpole, each swivel coupler comprises a retaining ring, a swivel ring, and a swivel base, wherein (a) the swivel ring includes a single swivel ring attachment hole for securing the flag, (b) the retaining ring has a through hole tapped thread for being engaged with the swivel base, and (c) the swivel base is an integral piece including a threaded top, a swivel shoulder in middle, and a bottom part sized larger than the swivel shoulder, said threaded top being adapted to receive the thread on the retaining ring, said swivel shoulder being adapted to directly engage with the swivel ring and allow the swivel ring to rotate around the swivel shoulder, snapping clamp inserts into interior surfaces of the upper and lower clamp bodies, positioning the upper and lower clamp bodies around the rail, moving the clamp bodies into the closed position, and fastening the clamp bodies by the fastener, in order to securely mount the device onto the rail.

15. The method of claim 14, further comprising adjusting two swivel coupler assemblies attached to shaft of the flagpole, and mounting the flag to the swivel coupler assemblies.

* * * * *